United States Patent [19]

Shindo et al.

[11] 4,203,331
[45] May 20, 1980

[54] AUTOMATIC TRANSMISSION WITH OVERDRIVE

[75] Inventors: Yoshio Shindo, Aichi; Hiroshi Ito, Ima, both of Japan

[73] Assignee: Toyota Jidosha Kogyo Kabushi Kaisha, Aichiken, Japan

[21] Appl. No.: 837,192

[22] Filed: Sep. 28, 1977

[30] Foreign Application Priority Data

Apr. 27, 1977 [JP] Japan .................... 52-47876

[51] Int. Cl.² .................... F16H 57/02; F16H 37/00
[52] U.S. Cl. .................... 74/606 R; 74/740
[58] Field of Search ............ 74/606 A, 606 R, 730, 74/740, 781 R

[56] References Cited

U.S. PATENT DOCUMENTS

| | | | |
|---|---|---|---|
| 3,214,989 | 11/1965 | Wellauer et al. | 74/606 X |
| 3,533,307 | 10/1970 | Gunderson | 74/781 R |

*Primary Examiner*—Albert W. Davis, Jr.
*Assistant Examiner*—Randall L. Green
*Attorney, Agent, or Firm*—Toren, McGeady and Stanger

[57] ABSTRACT

An automatic transmission including: a torque converter having a pump impeller, stator vanes and turbine vanes; an overdrive gear mechanism whose input side is operably connected to the turbine vanes and transmits torque at a gear reduction ratio of 1 or less than 1; an oil pump having a pump chamber defined by an oil pump body and an oil pump cover and generating a hydraulic pressure; an underdrive gear mechanism operably coupled to the output side of the overdrive gear mechanism and transmitting torque at a gear reduction ratio of more than 1 from its input side to its output side; an overdrive case encompassing the overdrive gear mechanism in cooperation with the oil pump cover and having a hole or holes communicating the overdrive gear mechanism with the underdrive gear mechanism; and a transmission case encompassing the sides of the under drive gear mechanism in cooperation with the overdrive case. In this automatic transmission, the overdrive case is positioned between the torque converter and the transmission case, and a breather port provided in a front, top portion of the transmission case communicates a space within the overdrive gear mechanism or a space in the transmission case with the atmosphere.

4 Claims, 5 Drawing Figures

AUTOMATIC TRANSMISSION WITH OVERDRIVE

BACKGROUND OF THE INVENTION

1. Field of the Invention

The present invention relates to an automatic transmission for use in an automotive vehicle, and more particularly to an automatic transmission having an overdrive gear mechanism positioned between a hydrokinetic torque converter and an underdrive mechanism.

2. Description of the Prior Art

As is well known, an automatic transmission for an automotive vehicle operates to automatically change gear reduction ratios in response to vehicle speed and load on the engine. An automatic transmission consists in general of a torque converter and an underdrive gear mechanism which is coupled to the converter and establishes two or more gear reduction ratios of no less than 1. Recently, a demand for an automatic transmission with an overdrive has arisen from the viewpoint of fuel economy, and emission control of the engine.

If an overdrive gear mechanism is added to an automatic transmission having a torque converter and an underdrive gear mechanism, when gear strength and capacity of frictional engaging means in the overdrive gear mechanism are desired to be decreased for improving durability and manufacturing cost, it is advantageous to position the overdrive gear mechanism between the torque converter and the underdrive gear mechanism rather than on an output side of the underdrive gear mechanism. (rear-side type). In other words, the output side of the overdrive gear mechanism is connected to an input side of the underdrive gear mechanism (front side type). In addition, the automatic transmission is equipped with a torque converter and a hydraulic control device, so that an oil pump is required for delivering hydraulic pressure thereto. The oil pump should be driven by being coupled to an pump impeller in the torque converter, so that in the case of the front side system, the oil pump is provided within a wall partitioning the torque converter from the overdrive gear mechanism. Furthermore, the overdrive case which encompasses the overdrive gear mechanism therewith partitions the overdrive gear mechanism from the underdrive gear mechanism, with the result that the underdrive gear mechanism is housed in a chamber or space which is independent of the underdrive gear mechanism.

An automatic transmission of this type suffers from a disadvantage in that air pressure in spaces within the overdrive gear mechanism and underdrive gear mechanism varies or increases thereby causing damage to oil seals provided within the automatic transmission. Additionally oil may be caused to blow out from the automatic transmission through a filler tube, into which an oil level gage is inserted. To cope with this, there is provided a breather circuit communicating with the atmosphere for minimizing the difference between the pressures in these spaces and atmospheric pressure. Oil which has lubricated and cooled the overdrive gear mechanism and underdrive gear mechanism is forced from a rotating body towards a peripheral portion of a casing due to a centrifugal force and then clings to the inner surface of the wall encompassing the overdrive case or transmission case. Accordingly, if the end of a breather circuit is positioned directly in the aforesaid inner surface, then oil tends to close the breather circuit or leaks therein. It follows from this that the breather circuit should run through complex passages formed in a oil pump body and an oil pump cover in the axial direction, rather than in the radial direction in a manner to connect with the overdrive gear mechanism and underdrive gear mechanism. In addition, in case the overdrive case is provided independently of the transmission case, then breather means should be provided separately. This leads to a complicated construction of housings or cases and an increase in manufacturing cost.

SUMMARY OF THE INVENTION

It is accordingly an object of the present invention to provide a automatic transmission with an overdrive gear mechanism interposed between a torque converter and an underdrive gear mechanism, in which a single breather circuit is provided.

According to the present invention, there is provided an automatic transmission, which includes: a torque converter having an pump impeller, stator vanes, and turbine vanes; an overdrive gear mechanism, whose input side is operably connected to the turbine vanes and transmits torque at a gear reduction ratio of 1 or less than 1; an oil pump having a pump chamber defined by an oil pump body and an oil pump cover, and generating a hydraulic pressure; an underdrive gear mechanism operably coupled to the output side of the overdrive gear mechanism and transmitting a torque at a gear reduction ratio of more than 1 from its input side to its output side; an overdrive case encompassing the overdrive gear mechanism in cooperation with the oil pump cover and having a hole or holes communicating the overdrive gear mechanism with the underdrive gear mechanism; and a transmission case encompassing the sides of the underdrive gear mechanism in cooperation with the overdrive case. In this automatic transmission, the overdrive case is positioned between the torque converter and the transmission case, and a breather port provided in a front, top portion of the transmission case communicates a space within the overdrive gear mechanism or a space in the transmission case with the atmosphere.

DESCRIPTION OF THE PREFERRED EMBODIMENTS

Figure 1:
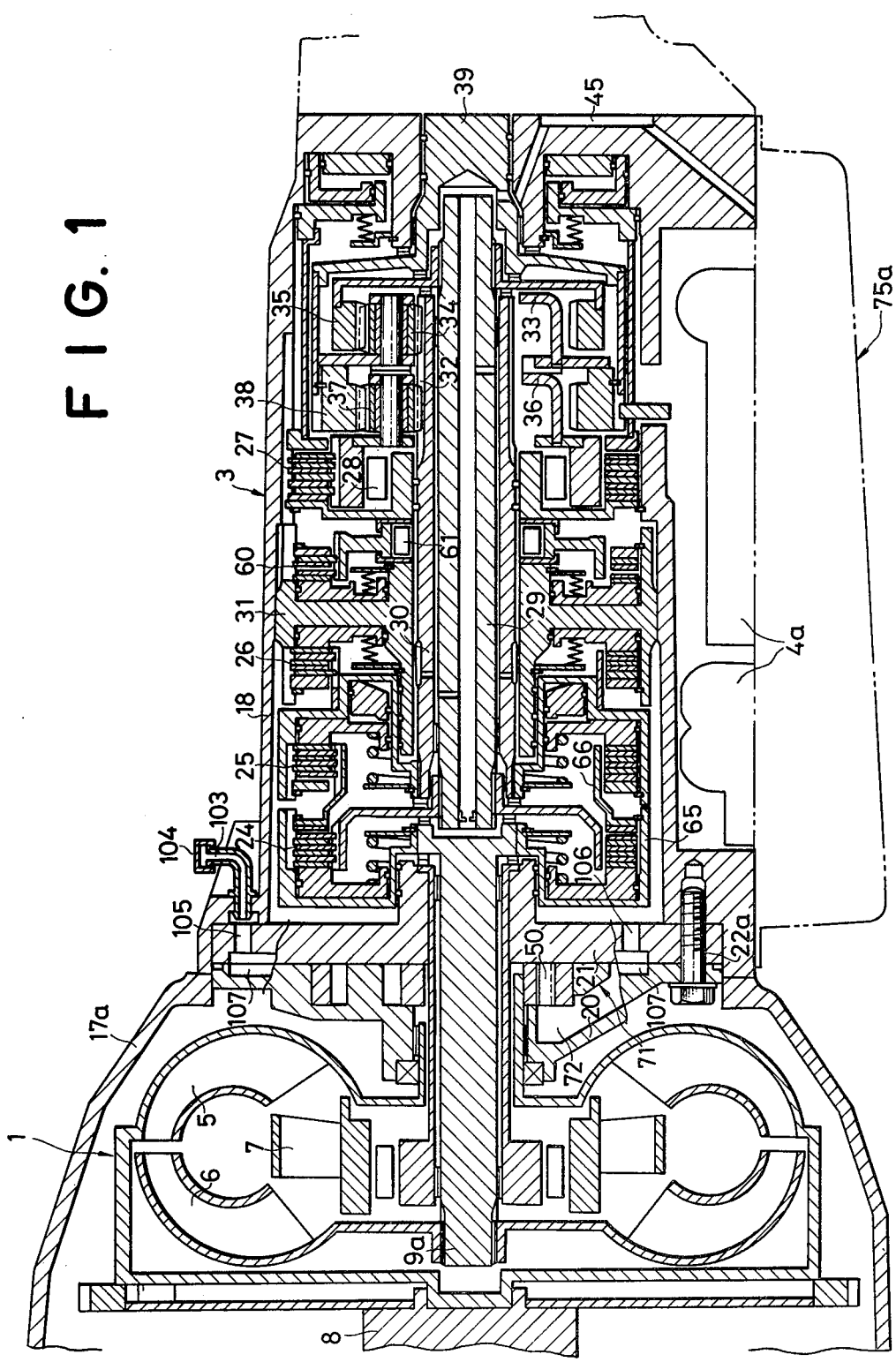
FIG. 1 is a longitudinal cross-sectional view of an automatic transmission which is devoid of an overdrive gear mechanism and of the type, which has been produced in a production line.

FIG. 1 is a longitudinal cross-sectional view of an automatic transmission of the type, which is used in automobiles currently available in the market. A hydrokinetic torque converter 1 includes a pump impeller 5, turbine vanes 6 and stator vanes 7. The pump impeller 5 is coupled to a crank shaft 8 of an engine (not shown), while the turbine vanes 6 are coupled to a turbine shaft 9a. The torque converter 1 is encompassed with a housing 17a in the radial direction thereof. The rear side of torque converter 1 is closed with an oil pump body 20. In this respect, it should be noted that a side closer to the engine is referred to as a "front side", and a side away from the engine is referred to as a "rear side". An oil pump cover 21 is placed adjacent to the oil pump body 20 and defines a pump chamber for accommodating an oil pump 71 therein, in cooperation with the oil pump body 20. An oil pump gear 50 in the oil pump 71 is coupled to the pump impellers 5. A passage 72 defined in the oil pump body 20 is connected to an inlet port for the oil pump 71 as well as to a passage not shown defined in a lower portion of the oil pump cover 21.

Positioned in the rear of the oil pump 71 but adjacent to the oil pump cover 21 in coaxial relation to the torque converter 1 is an underdrive gear mechanism for three-forward-speed and one-reverse-speed drive. The turbine shaft 9a serves as an input shaft of the underdrive gear mechanism 3. A front portion of the underdrive gear mechanism 3 is encompassed with the oil pump cover 21 and transmission case 18. The oil pump body 20, oil pump cover 21 and transmission case 18 are fastened together by means of two or more bolts 22a.

The turbine shaft 9a is coupled to a clutch cylinder 65, while a multiple disc clutch 24 is interposed between the clutch cylinder 65 and an intermediate shaft 29. A hub 66 is fitted in the clutch cylinder 65, while a multiple disc clutch 25 is disposed between the hub 66 and a sun gear shaft 30. Positioned between the sun gear shaft 30 and a support 31 secured to the transmission case 18 are a multiple disc brake 26, and a series connection of a one-way clutch 61 and a multiple disc brake 60. The sun gear shaft 30 is formed with a sun gear 32. The sun gear 32 meshes with planetary pinions 34 and 37, while one planetary pinion 37 meshes with a ring gear 35, and the other planetary pinion 34 meshes with a ring gear 38. In other words, there are provided two-row planetary gear units consisting of a combination of sun gear 32, planetary pinion 34 and ring gear 35 and another combination of sun gear 32, planetary pinion 37 and ring gear 38. The ring gear 35 is coupled through the medium of a linkage 67 to the intermediate shaft 29. The planetary pinion 34 is rotatably supported on a pinion shaft 69, while the planetary pinion 37 is rotatably supported on a pinion shaft 68 mounted on a carrier 36. An output shaft 38 of the underdrive gear mechanism 3 is coupled to the ring gear 38 and carrier 33. Provided between a carrier 36 and transmission case 18 are multiple disc brake 27 and a one-way clutch 28.

A lower side of the underdrive gear mechanism is covered with an oil pan 75a. The oil pan 75a accommodates therein a hydraulic control device 4a adapted to control a hydraulic pressure to be delivered to a hydraulic servo (cylinder) for the underdrive gear mechanism. A further passage (not shown) formed under the front end of transmission case 18 connects the oil passage (not shown) provided in the oil pump cover 21 to the interior of oil pan 75a.

In addition to the oil passage (not shown) provided in the oil pump cover 21, the oil pump cover 21 (partially shown) is provided with an oil passage connecting the hydraulic control device 4a to the clutch cylinder 65, and another oil passage connecting a discharge port of the oil pump 71 to the hydraulic control device 4a. In addition, an oil passage for delivering oil from the hydraulic control device 4a to the torque converter 1, and an oil passage for returning oil from the torque converter 1 to the hydraulic control device 4a are formed in the oil pump body 20 and oil pump cover 21.

Meanwhile, a level H1 not shown in FIG. 1 may be considered to represent the height or level of oil during normal cruising of a motor vehicle.

Figure 2:
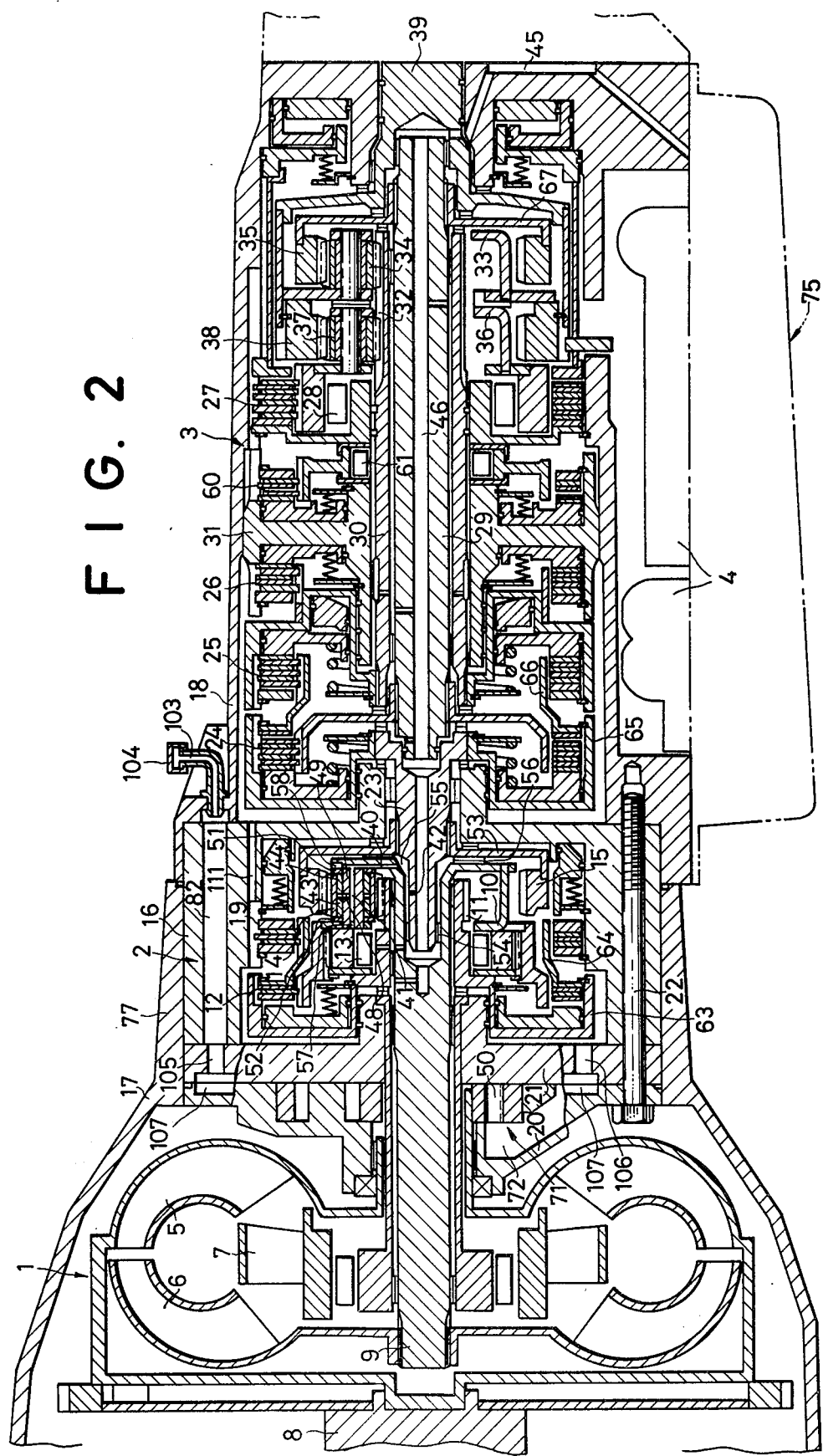
FIG. 2 is a longitudinal cross-sectional view of one embodiment of the automatic transmission with overdrive according to the present invention.

FIG. 2 is a longitudinal cross-sectional view of an automatic transmission having an overdrive gear mechanism 2 according to the present invention. Like parts are designated with like reference numerals in common with those given in FIG. 1.

The turbine shaft 9 serves as an output shaft for the torque converter 1, as well as an input shaft for the overdrive gear mechanism, being coupled to the carrier 10 for a planetary gear unit in the overdrive gear mechanism. The carrier 10 is formed with a pinion shaft 49, while needle bearings 43, 44 are fitted on the pinion shaft 49 in two rows. The planetary pinion 14 is rotatably supported by the pinion shaft 49 through the medium of needle bearings 43, 44, and meshes with the sun gear 11 and ring gear 15. Thrust washers 51, 52 are provided between the planetary pinion 14 and the carrier 10 on the opposite sides, respectively. The sun gear shaft 78 carrying the sun gear 11 thereon is coupled to a clutch cylinder 63. A hub 64 is splined to the clutch cylinder 63. A multiple disc clutch 12 is positioned between the clutch cylinder 63 and the carrier 10, while a one-way clutch 13 is provided between the sun gear shaft 78 and the carrier 10. A multiple disc brake 19 is provided between the hub 64 and the overdrive case 16 accommodating the overdrive gear mechanism therein. The housing 17 encompasses the torque converter 1, and is formed with an extension portion 77 having a cylindrical inner surface. The overdrive case 16 has an cylindrical wall fitted in the inner cylindrical surface of the extension portion 77. A flange 53 is coupled to the ring gear 15 and splined to an input shaft 23 of the underdrive gear mechanism 3. The input shaft 23 is positioned in coaxial relation to the turbine shaft 9 and coupled to the clutch cylinder 63 in the underdrive gear mechanism 3. A bearing 54 is interposed between the turbine shaft 9 and the input shaft 23, while a washer 56 is positioned between the carrier 10 and the flange 53. The oil pump body 20, oil pump cover 21, overdrive case 16 and transmission case 18 are fastened together by means of two or more bolts 22.

The relationship between change-gear positions and operations of respective clutches and brakes in the automatic transmission thus arranged is shown in the following Table 1.

Table 1

| shift position | | 12 | 25 | 19 | 26 | 27 | 13 | 28 | 61 | 60 | |
|---|---|---|---|---|---|---|---|---|---|---|---|
| | P | O | X | X | X | X | O | / | / | / | X |
| | R | O | X | O | X | X | O | RC | RC | OR | X |
| | N | O | X | X | X | X | X | / | / | / | X |
| D | 1st speed drive | O | O | X | X | X | X | RC | RC | RC | X |
| | 2nd speed drive | O | O | X | X | O | X | RC | OR | RC | O |
| | 3rd speed drive | O | O | O | X | X | X | RC | OR | OR | O |
| | OD | X | O | O | O | X | X | OR | OR | OR | O |
| 2 | 1st speed drive | O | O | X | X | X | X | RC | RC | RC | X |
| | 2nd speed drive | O | O | X | X | O | X | RC | OR | RC | O |
| L | | O | O | X | X | X | O | RC | RC | OR | X |

In Table 1, the reference characters and symbols shown therein are designated as follows:

P . . . parking range
R . . . reverse range

N ... neutral range
D ... drive range
2 ... second range
L ... low range
O ... engaged condition
X ... released condition
RC ... locked condition
OR ... overrun condition
* ... torque is not transmitted.

In the lubrication and cooling of respective components constituting the overdrive gear mechanism 2 and underdrive gear mechanism 3, oil which has been pressurized by the oil pump 71 is adjusted to a given pressure level by the hydraulic control device 4. The oil thus adjusted is delivered via oil passage 45 in the transmission case 18 and an oil passage in the intermediate shaft 29 to respective components of the overdrive gear mechanism 2 and underdrive gear mechanism 3 for lubrication and cooling. Specific oil passage means is provided in the overdrive gear mechanism 2 for lubricating and cooling the neighborhood of the needle bearings 43, 44. In other words, an oil chamber 55 is defined by the input shaft 23 and turbine shaft 9 therebetween. The oil chamber 55 is communicated with an inner bore provided in the input shaft 23 via a hole 42 provided in the wall of the input shaft 23. Oil passage 40 runs in the radial direction of the carrier 10 and is communicated with the oil chamber 55 at one end thereof, and blocked with a plug 58 at the other end. An oil passage 41 runs through the pinion shaft 49 in the axial direction. The oil passage 41 is connected to the oil passage 40 at one end thereof and blocked with a plug 57 at the other end. Midway of the pinion shaft 49 as viewed in the axial direction, there is provided an oil passage 48 which is connected to the oil passage 41 at one end and terminates between the needle bearings 43, 44. Respective elements in the neighborhood of the needle bearings 43, 44 are lubricated and cooled with oil of a given pressure, which is supplied through hole 42, oil chamber 55 and oil passages 40, 41, 48.

Figure 3:
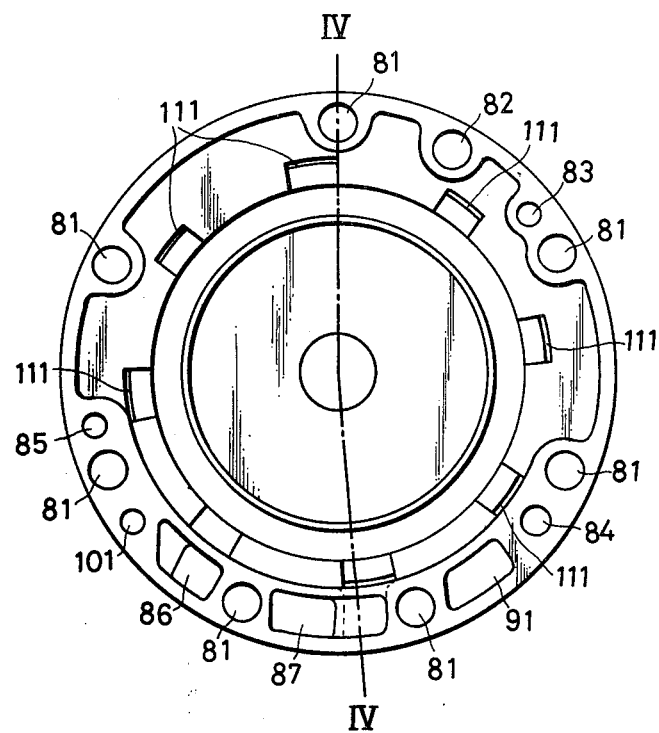
FIG. 3 is a left-hand side view of an overdrive case.
Figure 4:
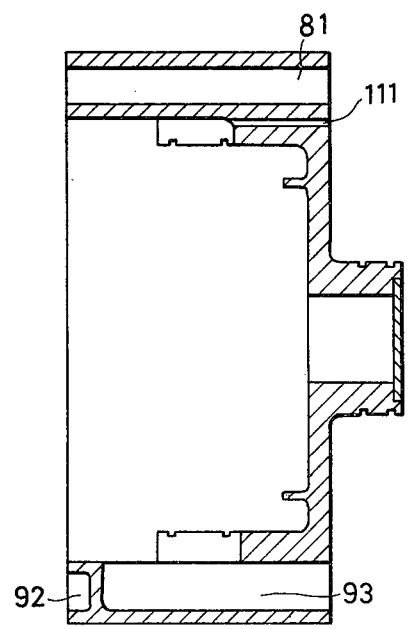
FIG. 4 is a cross-sectional view of the overdrive case taken along the line IV—IV of FIG. 3.
Figure 5:
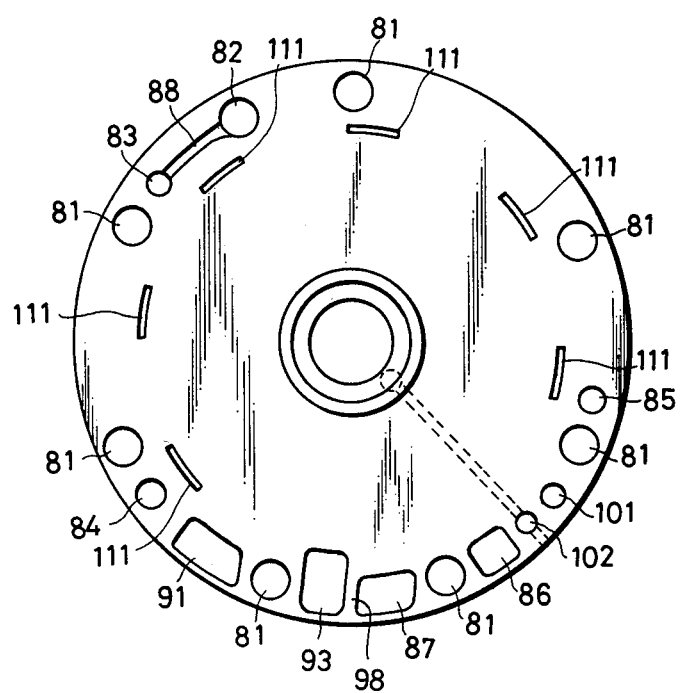
FIG. 5 is a right-hand side view of the overdrive case.

FIG. 3 shows the left-hand side view of the overdrive case 16 (on the side of the torque converter 1). FIG. 4 is a cross-sectional view taken along the line IV—IV of FIG. 3. FIG. 5 is a right-hand side view of the overdrive case 16 (on the side of underdrive gear mechanism 3). The vertical direction shown in FIGS. 3 and 5 corresponds to the direction normal to the ground, while the left-hand side thereof corresponds to the side of the torque converter, and the right-hand side thereof corresponds to the side of underdrive gear mechanism 3. A hole 81, has a bolt 22 extending therethrough. A breather passage 82 is provided in the overdrive gear case 2 and connects a breather port 104 to a hole 105 in the oil pump body 20. An oil return passage 83 is provided under the breather passage 82 for preventing leakage of oil from the breather port in the underdrive gear mechanism 3. The breather passage 82 is communicated with the oil return passage 83 via groove 111 provided in the end surface of the overdrive case 16 on the side of the underdrive gear mechanism 3. In this manner, oil within the breather passage 82 is returned along the oil return passage 83, without leaking from the breather port.

A supply passage 84 is provided for supplying oil from the hydraulic control device 4 to the torque converter 1. An exhaust passage 85 is provided for returning oil from the torque converter 1 to the hydraulic control device 4. Intake passages 86, 87 operate to introduce oil from the oil pan 75 positioned under the underdrive gear mechanism 3 to the oil pump 71. A discharge passage 91 introduces oil pressurized by the oil pump 71 to the hydraulic control device 4 positioned under the underdrive gear mechanism 3. The intake passage 87 is connected to the oil passage (not shown) in the oil pump cover 21 at the front end of the passage 87, and connected to an oil passage (not shown) positioned in side-by-side relation to the further oil passage (not shown) through the medium of a wall at the rear end of the passage 87. The intake passage 87 is positioned in the lowermost portion of the overdrive case for connection with the oil passage (not shown) through the cover 21 and formed with an enlarged portion 92 at the front end of the passage 87. The exhaust passage 93 is formed in the lowermost portion of the periphery of the overdrive case 16 in side-by-side relation to the intake passage 87 and communicated with a lower portion of a space within the overdrive case 16, while being connected to the oil pan 75 at the rear end of the passage 93. The intake passage 87 and the exhaust passage 93 are partitioned by a wall 98. A passage 101 connects the hydraulic control device 4 to the multiple disc clutch 12 for introducing a hydraulic pressure to the latter. A passage 102 connects the hydraulic control device 4 to the clutch cylinder 65 for introducing a hydraulic pressure thereto.

Passages 82, 83, 84, 85, 86, 87, 91, 101 run through a peripheral portion of the overdrive case 16 in traversing relationship thereto. A plurality of communicating holes 111 are provided in the end wall of the overdrive case 16 in concentric relationship to the aforesaid passages radially internally thereof. The communicating holes 111 bring a space in the overdrive gear mechanism 2 into communication with a space in the underdrive gear mechanism 3, thereby equalizing the pressures prevailing therein. The communicating holes 111 are in turn communicated with the breather port 104.

As is apparent from the foregoing, the provision of the communicating holes 111 in the overdrive case 16 eliminates a need to provide an additional breather circuit for the automatic transmission having an overdrive gear mechanism. In this embodiment, the breather port 103 is provided in the transmission case 18. Alternatively, the breather port 103 may be provided in the overdrive case 16. In this respect, the breather port 103 provided in the transmission case 18 is positioned in alignment with a breather passage 82 in the overdrive case 16. Accordingly, the breather port as used in a conventional type transmission case may be utilized intact for the automatic transmission having an overdrive gear mechanism interposed between the torque converter and the underdrive gear mechanism, all of which are provided as segments adapted to be assembled together.

While specific embodiments of the invention have been shown and described in detail to illustrate the application of the inventive principles, it will be understood that the invention may be embodied otherwise without departing from such principles.

What is claimed is:

1. An automatic transmission comprising: a fluid torque converter; an overdrive gear mechanism having an input side operably connected to said torque converter; an oil pump having a pump chamber defined by an oil pump body and an oil pump cover and generating a hydraulic pressure; an underdrive gear mechanism operably coupled to an output side of said overdrive gear mechanism, said overdrive gear mechanism thus being located between said torque converter and said underdrive gear mechanism; an overdrive case encompassing said overdrive gear mechanism in cooperation with said oil pump cover; a transmission case extending to encompass the sides of said underdrive gear mechanism in cooperation with said overdrive case; a breather port in communication with the outside atmosphere; oil supply means located generally beneath said underdrive gear mechanism; oil supply passage means defining an oil supply and return system through said automatic transmission between said oil supply means and said oil pump for delivering oil to the operative elements of said automatic transmission; means defining through said overdrive case a plurality of oil supply and return passages formed as part of said oil supply and return system, said passages extending generally axially through said case and being generally located toward the outer circumferential regions thereof; a breather passage extending axially through said overdrive case in communication between said breather port and said oil pump; and a plurality of radially extending communicating holes arranged in flow communication between selected ones of said plurality of oil supply and return passages defined through said overdrive case to eliminate in said automatic transmission the need for further breather passages in said automatic transmission.

2. An automatic transmission according to claim 1 wherein said breather port is provided in a front, top portion of said transmission case.

3. An automatic transmission according to claim 1 wherein said communicating holes are provided in end walls of said overdrive case, one of said end walls being bounded by said underdrive gear mechanism.

4. An automatic transmission according to claim 1 wherein said breather port is defined to extend through said overdrive case.

* * * * *